US011233994B2

United States Patent
Ström et al.

(10) Patent No.: US 11,233,994 B2
(45) Date of Patent: Jan. 25, 2022

(54) BILATERAL ALPHA OMEGA: CALCULATING LUT ARGUMENT WITH FEW ARITHMETIC OPERATIONS

(71) Applicant: Telefonaktiebolaget LM Ericsson (publ), Stockholm (SE)

(72) Inventors: Jacob Ström, Stockholm (SE); Per Wennersten, Årsta (SE); Jack Enhorn, Kista (SE); Du Liu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/259,380

(22) PCT Filed: Jul. 9, 2019

(86) PCT No.: PCT/EP2019/068342
§ 371 (c)(1),
(2) Date: Jan. 11, 2021

(87) PCT Pub. No.: WO2020/011756
PCT Pub. Date: Jan. 16, 2020

(65) Prior Publication Data
US 2021/0274171 A1 Sep. 2, 2021

Related U.S. Application Data

(60) Provisional application No. 62/697,243, filed on Jul. 12, 2018.

(51) Int. Cl.
*H04N 19/117* (2014.01)
*H04N 19/635* (2014.01)
(Continued)

(52) U.S. Cl.
CPC ......... *H04N 19/117* (2014.11); *H04N 19/167* (2014.11); *H04N 19/172* (2014.11);
(Continued)

(58) Field of Classification Search
CPC .... H04N 19/635; H04N 19/80; H04N 19/117; H04N 19/198
See application file for complete search history.

(56) References Cited

U.S. PATENT DOCUMENTS

| | | |
|---|---|---|
| 2005/0025378 A1 | 2/2005 | Maurer |
| 2017/0185863 A1 | 6/2017 | Chandra et al. |

FOREIGN PATENT DOCUMENTS

| | | |
|---|---|---|
| WO | 2018/067051 A1 | 4/2018 |
| WO | 2018/117938 A1 | 6/2018 |

OTHER PUBLICATIONS

International Search Report and Written Opinion issued in International Application No. PCT/EP2019/068342 dated Sep. 25, 2019 (12 pages).

(Continued)

*Primary Examiner* — Kyle M Lotfi
(74) *Attorney, Agent, or Firm* — Rothwell, Figg, Ernst & Manbeck, P.C.

(57) ABSTRACT

According to a first aspect, a method is provided. The method includes obtaining an M×N array of pixel values an image; determining a weight selection value for position x,y in the M×N array; and using the weight selection value to obtain a weight value for use in a filter for filtering the image. Determining the weight selection value for position x,y (omega$_{x,y}$) includes: a) retrieving a previously determined weight selection value for position x,y−1 (omega$_{x,y-1}$); b) retrieving a previously determined alpha value (a) for position x,y−1; c) calculating a delta value (d); and d) calculating omega$_{x,y}$=omega$_{x,y-1}$−a+d. Calculating d includes: i) retrieving a first previously determined value (omega_row); i) retrieving a second previously determined value (alpha_row); and ii) calculating d=omega_row−alpha_row+abs($A_{x+1,y+1}$−$A_{x+1,y+2}$), wherein $A_{x+1,y+1}$ is the (Continued)

value stored in position x+1,y+1 of the array and $A_{x+1,y+2}$ is the value stored in position x+1,y+2 of the array.

4 Claims, 7 Drawing Sheets

(51) Int. Cl.
    *H04N 19/80*     (2014.01)
    *H04N 19/167*     (2014.01)
    *H04N 19/172*     (2014.01)
    *H04N 19/196*     (2014.01)

(52) U.S. Cl.
    CPC ......... *H04N 19/198* (2014.11); *H04N 19/635* (2014.11); *H04N 19/80* (2014.11)

(56) References Cited

OTHER PUBLICATIONS

Ström, J., et al., "AHG 2 related: Reduced complexity bilateral filter," Joint Video Experts Team (JVET) of ITU-T SG 16 WP 3 and ISO/IEC JTC 1/SC 29/WG 11, Document: JVET-K0274-v2, 11th Meeting: Ljubjiana, SI, Jul. 2018 (11 pages).

Ström, J., et al., "JVET-K0274 Reduced complexity bilateral filter," Ericsson Research, Jul. 2018 (31 pages).

Wennersten, P., et al., "Bilateral Filtering for Video Coding," 2017 IEEE Visual Communications and Image Processing (VCIP), IEEE, Dec. 2017 (4 pages).

Chen, Y., et al., "Description of SDR, HDR and 360° video coding technology proposal by Qualcomm and Technicolor—low and high complexity versions," Joint Video Exploration Team (JVET) of ITU-T SG 16 WP 3 and ISO/IEC JTC 1/SC 29/WG 11, Document: JVET-J0021, 10th Meeting: San Diego, US Apr. 2018 (43 pages).

BILATERAL ALPHA OMEGA: CALCULATING LUT ARGUMENT WITH FEW ARITHMETIC OPERATIONS

CROSS-REFERENCE TO RELATED APPLICATION(S)

This application is a 35 U.S.C. § 371 National Stage of International Patent Application No. PCT/EP2019/068342, filed Jul. 9, 2019, designating the United States and claiming priority to U.S. provisional application No. 62/697,243, filed on Jul. 12, 2018. The above identified applications are incorporated by reference.

TECHNICAL FIELD

Disclosed are embodiments related to video compression and filtering.

BACKGROUND

As has previously been identified, bilateral filtering of image data directly after forming the reconstructed image block can be beneficial for video compression. As described by Wennersten et al., it is possible to reach a bit rate reduction of 0.5% with maintained visual quality for a complexity increase of 3% (encode) and 0% (decode) for random access. See P. Wennersten, J. Ström, Y. Wang, K. Andersson, R. Sjöberg, J. Enhorn, "Bilateral Filtering for Video Coding", IEEE Visual Communications and Image Processing (VCIP), December 2017, downloadable from: jacobstrom.com slash publications slash Wennersten_et_al_VCIP2017 dot pdf (hereinafter referred to as "[1]"). However, it was shown in subsequent work that it is possible to increase the performance of the filter by averaging the argument used to calculate the weight over a small area of 3×3 samples. See Y. Chen, et al., "Description of SDR, HDR and 360° video coding technology proposal by Qualcomm and Technicolor—low and high complexity versions" Document JVET-J0021 version 5 available at phenix.int-evry.fr/jvet/doc_end_user/documents/10_San%20Diego/wg11/JVET-J0021-v5.zip (hereinafter referred to as "[2]"). This way, more than 0.5% bit rate reduction can be achieved.

SUMMARY

Even though the gain in terms of Bjontegard Delta rate (BD rate) is improved when averaging the argument used to calculate the weight (as in [2]), this comes at a cost. In [1], the argument was calculated from two intensity values $I_1$ and $I_2$ as $|\Delta I|=I_1-I_2|=abs(I_1-I_2)$, where abs or |•| denotes taking the absolute value. We will call each such operation an absdiff operation, since it requires both an absolute value calculation and a difference calculation (subtraction). In [2], instead of just one absdiff operation, nine such values are calculated and averaged. Even though nine such operations do not cost much in terms of number of CPU clock cycles, when they are in the inner loop of a filtering operation they become expensive. Likewise, even though a set of nine such operations do not cost much in terms of silicon surface area when implemented in a full custom ASIC, when many such sets must be instantiated in order to process many samples in parallel, it can become expensive. In [1] and [2], two weights are determined per filtered pixel, resulting in 18 absdiff operations per pixel.

In previous art, which has been sent to an outside company as part of a cross-check to a standardization contribution (JVET-K0274), we managed to reduce the number of absdiff operations to three per weight, or six per filtered sample. See JVET-K0274: J. Ström, P. Wennersten, J. Enhorn, D. Liu, K. Andersson, R. Sjöberg "CE2 related: Reduced complexity bilateral filter", JVET-K0274_v2_clean_version.docx available at phenix.int-evry.fr/jvet/doc_end_user/documents/11_Ljubljana/wg11/JVET-K0274-v3.zip (hereinafter referred to as "[3]"). This savings of a factor of three is substantial, but is not enough, since six absdiff operations in an inner loop or in parallel instantiations are still expensive.

One aspect of the present invention is to reuse already calculated absdiff values in order to avoid performing the absdiff calculation again. This way we can get the number of absdiff operations needed per weight down to just one, and the number of absdiff operations needed per sample down to just two.

By getting the number of absdiff operations down to just two per filtered sample, it is possible to implement the method from [2] with the same number of absdiff operations per filtered sample as the method from [1]. In terms of absdiff operations, therefore, the proposed method is no more complex than [1]. In terms of BD rate performance, though, it has the same improved performance as the method in [2].

According to a first aspect, a method is provided. The method includes obtaining an M×N array of pixel values an image; determining a weight selection value for position x,y in the M×N array; and using the weight selection value to obtain a weight value for use in a filter for filtering the image. Determining the weight selection value for position x,y ($omega_{x,y}$) includes: a) retrieving a previously determined weight selection value for position x,y−1 ($omega_{x,y-1}$); b) retrieving a previously determined alpha value (a) for position x,y−1; c) calculating a delta value (d); and d) calculating $omega_{x,y}=omega_{x,y-1}-a+d$. Calculating d includes: i) retrieving a first previously determined value (omega_row); i) retrieving a second previously determined value (alpha_row); and ii) calculating d=omega_row−alpha_row+abs($A_{x+1,y+1}-A_{x+1,y+2}$), wherein $A_{x+1,y+1}$ is the value stored in position x+1,y+1 of the array and $A_{x+1,y+2}$ is the value stored in position x+1,y+2 of the array.

In some embodiments, omega_row is equal to [abs($A_{x-2,y+1}-A_{x-2,y+2}$)+abs($A_{x-1,y+1}-A_{x-2,y+2}$)+abs($A_{x,y+1}-A_{x,y+2}$)], and alpha_row is equal to abs($A_{x-2,y+1}-A_{x-2,y+2}$).

According to a second aspect, an encoder is provided. The encoder includes an obtaining unit configured to obtain an M×N array of pixel values an image; a determining unit configured to determine a weight selection value for position x,y in the M×N array; and a using unit configured to use the weight selection value to obtain a weight value for use in a filter for filtering the image. Determining the weight selection value for position x,y ($omega_{x,y}$) includes: a) retrieving by a retrieving unit a previously determined weight selection value for position x,y−1 ($omega_{x,y-1}$); b) retrieving by the retrieving unit a previously determined alpha value (a) for position x,y−1; c) calculating by a calculating unit a delta value (d); and d) calculating by the calculating unit $omega_{x,y}=omega_{x,y-1}-a+d$. Calculating d includes: i) retrieving by the retrieving unit a first previously determined value (omega_row); i) retrieving by the retrieving unit a second previously determined value (alpha_row); and ii) calculating by the calculating unit d=omega_row−alpha_row+abs($A_{x+1,y+1}-A_{x+1,y+2}$), wherein $A_{x+1,y+1}$ is the value stored in position x+1,y+1 of the array and $A_{x+1,y+2}$ is the value stored in position x+1,y+2 of the array.

According to a third aspect, a decoder is provided. The decoder includes an obtaining unit configured to obtain an M×N array of pixel values an image; a determining unit configured to determine a weight selection value for position x,y in the M×N array; and a using unit configured to use the weight selection value to obtain a weight value for use in a filter for filtering the image. Determining the weight selection value for position x,y (omega$_{x,y}$) includes: a) retrieving by a retrieving unit a previously determined weight selection value for position x,y−1 (omega$_{x,y-1}$); b) retrieving by the retrieving unit a previously determined alpha value (a) for position x,y−1; c) calculating by a calculating unit a delta value (d); and d) calculating by the calculating unit omega$_{x,y}$=omega$_{x,y-1}$−a+d. Calculating d includes: i) retrieving by the retrieving unit a first previously determined value (omega_row); i) retrieving by the retrieving unit a second previously determined value (alpha_row); and ii) calculating by the calculating unit d=omega_row−alpha_row+abs(A$_{x+1,y+1}$−A$_{x+1,y+2}$), wherein A$_{x+1,y+1}$ is the value stored in position x+1,y+1 of the array and A$_{x+1,y+2}$ is the value stored in position x+1,y+2 of the array.

According to a fourth aspect, a computer program is provided. The computer program includes instructions which when executed by processing circuitry of a device causes the device to perform the method of any one of the embodiments of the first aspect.

According to a fifth aspect, a carrier containing the computer program of embodiments of the fourth aspect is provided. The carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
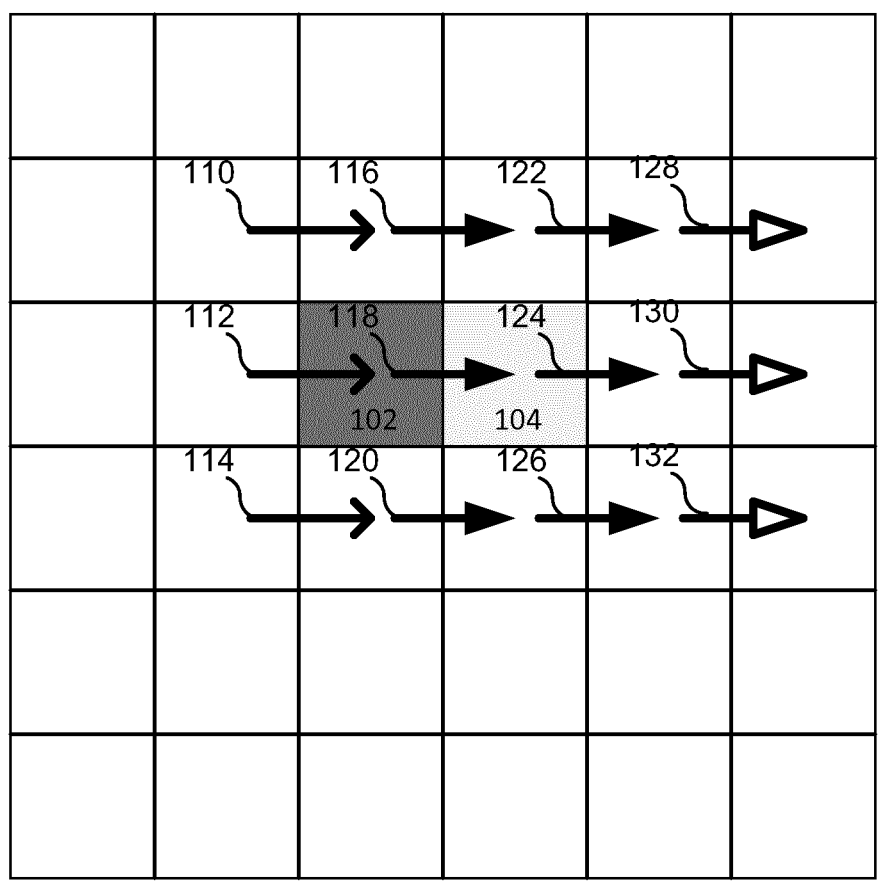
FIG. 1 illustrates a diagram according to one embodiment.

Throughout this description we will use filtering of intensity values as an example. This traditionally refers to the Y in YCbCr. However, it should be noted that this filtering can also be used for chroma values such as Cb and Cr, or any other components from other color spaces such as ICTCP, Lab, Y'u'v' etc. We should also use the terms "pixel" and "sample" interchangeably.

The filter from [2] is also described in JVET-0274, which has been made publicly available in [3].

Assume that we want to filter the sample a$_{3,3}$ shown below. Sample a$_{3,3}$ is surrounded by other samples a$_{i,j}$ that form a block of samples.

| $a_{1,1}$ | $a_{1,2}$ | $a_{1,3}$ | $a_{1,4}$ | $a_{1,5}$ | ... |
|---|---|---|---|---|---|
| $a_{2,1}$ | $a_{2,2}$ | $a_{2,3}$ | $a_{2,4}$ | $a_{2,5}$ | |
| $a_{3,1}$ | $a_{3,2}$ | $a_{3,3}$ | $a_{3,4}$ | $a_{3,5}$ | |
| $a_{4,1}$ | $a_{4,2}$ | $a_{4,3}$ | $a_{4,4}$ | $a_{4,5}$ | |
| $a_{5,1}$ | $a_{5,2}$ | $a_{5,3}$ | $a_{5,4}$ | $a_{5,5}$ | |
| . | | | | | . |
| . | | | | | . |
| . | | | | | . |

If this were the filter from [1] the right weight would be calculated from deltaR, which equals deltaR=$\Delta I_R$−a$_{3,4}$−a$_{3,3}$, and the absolute value of that would be used for the look-up:

deltaIR=a34−a33;

influenceR=weightLUT[min(maxVal,abs(deltaIR))]
*deltaIR;

As shown above, the weight calculation is performed by a look-up table (LUT). In the above calculation, note how only one absdiff operation (i.e. an operation of an absolute value taken of a difference of samples) is performed to get the weight value (influenceR) from the LUT. In contrast, following [2], we instead calculate the average absolute value by $$NL_R = \frac{1}{9} \sum_{\substack{i=2..4 \\ j=2..4}} |a_{i+1,j} - a_{i,j}|, \quad \text{(Eq. 1)}$$

It is easy to see that this involves nine absdiff calculations. In plain code, it could look like this:

```
NL_R = ( (abs(a23−a22) + abs(a24−a23) + abs(a25−a24) +
    abs(a33−a32) + abs(a34−a33) + abs(a35−a34) +
    abs(a43−a42) + abs(a44−a43) + abs(a45−a44)) * 114 ) >> 10;
deltaIR = a34−a33;
influenceR = weightLUT[min(maxVal, abs(NL_R))]*deltaIR;
```

The following matlab program calculates the sum R (which is equal to 9NL$_R$) for every pixel at least two steps away from the edge. Note that in matlab, y-coordinates come first.

```
A = round(7*rand([8 8]));
B = zeros(size(A));
R = zeros(size(A));
for yy = 3:size(A,1)−2
    for xx = 3:size(A,2)−2
        R(yy,xx) =   abs(A(yy−1,xx−1)−A(yy−1,xx )) + abs(A(yy
                    ,xx−1)−A(yy ,xx )) + ...
                    abs(A(yy+1,xx−1)−A(yy+1,xx )) + ...
                    abs(A(yy−1,xx )−A(yy−1,xx+1)) + abs(A(yy ,xx
                    )−A(yy ,xx+1)) + ...
                    abs(A(yy+1,xx )−A(yy+1,xx+1)) + ...
                    abs(A(yy−1,xx+1)−A(yy−1,xx+2)) + abs(A(yy
                    ,xx+1)−A(yy ,xx+2)) + ...
                    abs(A(yy+1,xx+1)−A(yy+1,xx+2));
    end;
end;
```

In the code accompanying the contribution JVET-K0274, it was realized that the value of R(x,y) in one point (x,y), can be calculated from the value of R in a point (x−1,y) immediately to the left of it. In the code the value R was named omega, or Ω.

In FIG. 1, each arrow represents an absdiff value between the two pixels where the arrow starts and ends. The omega value (alternatively referred to as the R value) for the dark gray pixel (shown as 102) is the sum of all the absdiff values represented by the nine leftmost arrows in the figure (shown as 110-126). The omega value needed for the filtering of the light gray pixel (show as 104) is the sum of the nine rightmost arrows (shown as 116-132).

The omega value for the light gray pixel 104 may be calculated by summing all the absdiff values represented by the nine rightmost arrows 116-132.

The software associated with JVET-K0274 denotes the sum of the values represented by the leftmost arrows 110-114 by alpha, and the sum of the values represented by the rightmost arrows 128-132 by delta. If the omega for the dark gray pixel 102 is known (omega_old), it is then possible to calculate the omega for the light gray pixel 104 (omega_new) as omega_new=omega_old−alpha+delta.

Here the previous omega as well as the alpha value is known from previous calculation, and only the delta value (involving three absdiff calculations) is needed to be calculated. Also, rather than throwing away the delta value after using it in the equation above, it is recognized that this value will become the alpha pixel for a pixel two steps to the right. This is solved by moving the delta value to a gamma value, and before that move the gamma value to a beta value, and before that move the beta value to the alpha value. This is reflected in the C++ code from JVET-K0274.

```
// calculate non-local values:
delta = abs(*(blockCurrentPixelPtr+offsetY0+1) −
   *(blockCurrentPixelPtr+offsetY0+2)) +
abs(*(blockCurrentPixelPtr+1) − *(blockCurrentPixelPtr+2)) +
abs(*(blockCurrentPixelPtr−
offsetY0+1) − *(blockCurrentPixelPtr−offsetY0+2));
   omega = omega − alpha + delta;
   dNLIR = (omega * 114) >> 10;
   alpha = beta;
   beta = gamma;
   gamma = delta;
   // end calc
   rightInfluence =
   twoSidedSBWeightLookupTablePtr[std::min(theMaxPosAltSB,
dNLIR)]*dIR;
```

As can be seen in the code, three absdiff operations are carried out. The omega value is then divided by nine (approximated by 114/1024 in the code) to calculate the dNLIR value that is used to obtain the weight from the look-up table.

An analogous code is used to calculate the bottomInfluence, where differences between pixels below are carried out instead of difference between pixels to the right. In this case the C++ code from JVET-K0274 looks like this:

```
// calc non-local value
   deltaRowValue = abs(*(blockCurrentPixelPtr−offsetY0−1) −
   *(blockCurrentPixelPtr−
twoOffsetY0−1)) + abs(*(blockCurrentPixelPtr−offsetY0) −
*(blockCurrentPixelPtr−twoOffsetY0)) +
abs(*(blockCurrentPixelPtr−offsetY0+1) −
*(blockCurrentPixelPtr−twoOffsetY0+1));
   *(omegaRowPtr) = *(omegaRowPtr) − *(alphaRowPtr) +
   deltaRowValue;
   *(alphaRowPtr++) = *(betaRowPtr);
   *(betaRowPtr++) = *(gammaRowPtr);
   *(gammaRowPtr++) = deltaRowValue;
   dNLIB = (*(omegaRowPtr++) * 114) >> 10;
   blockCurrentPixelPtr++;
   // end calc
   bottomInfluence =
   twoSidedSBWeightLookupTablePtr[std::min(theMaxPosAltSB,
   dNLIB)]*dIB;
```

In this case, three line buffers omegaRow, alphaRow, betaRow and gammaRow are used to store the omega, alpha, beta and gamma values. A line buffer here means an array that can hold as many values as the block is wide. The equivalent matlab code would look like this:

```
%% pre-populate alpharow, betarow, gammarow and omegarow:
B2 = zeros(size(A));
yy = 2;
     %% pre-populate alpha, beta, gamma and omega:
     for xx = 3:size(A,2)−2
         alpharow(xx) = abs(A(yy−1,xx−1)−A(yy ,xx−1)) + abs(A(yy−1,xx )−A(yy ,xx )) +
abs(A(yy−1,xx+1)−A(yy ,xx+1));
         betarow(xx) = abs(A(yy ,xx−1)−A(yy+1,xx−1)) + abs(A(yy ,xx )−A(yy+1,xx )) + abs(A(yy
,xx+1)−A(yy+1,xx+1));
         gammarow(xx) = abs(A(yy+1,xx−1)−A(yy+2,xx−1)) + abs(A(yy+1,xx )−A(yy+2,xx )) +
abs(A(yy+1,xx+1)−A(yy+2,xx+1));
         omegarow(xx) = alpharow(xx) + betarow(xx) + gammarow(xx);
     end;
% filter block
for yy = 3:size(A,1)−2
     %% pre-populate alpha, beta, gamma and omega:
     xx = 2;
     alpha = abs(A(yy−1,xx−1)−A(yy−1,xx )) + abs(A(yy ,xx−1)−A(yy ,xx )) + abs(A(yy+1,xx−1)−
A(yy+1,xx ));
     beta = abs(A(yy−1,xx )−A(yy−1,xx+1)) + abs(A(yy ,xx )−A(yy ,xx+1)) + abs(A(yy+1,xx )−
A(yy+1,xx+1));
     gamma = abs(A(yy−1,xx+1)−A(yy−1,xx+2)) + abs(A(yy ,xx+1)−A(yy ,xx+2)) + abs(A(yy+1,xx+1)−
A(yy+1,xx+2));
     omega = alpha + beta + gamma;
     for xx = 3:size(A,2)−2
         delta = abs(A(yy−1,xx+1)−A(yy−1, xx+2)) + abs(A(yy ,xx+1)−A(yy ,xx+2)) +
```

```
abs(A(yy+1,xx+1)-A(yy+1,xx+2));
        omega = omega - alpha + delta;
        alpha = beta;
        beta = gamma;
        gamma = delta;
        R2(yy,xx) = omega;
        deltarow_value = abs(A(yy+1,xx-1)-A(yy+2,xx-1)) + abs(A(yy+1,xx )-A(yy+2,xx )) +
abs(A(yy+1,xx+1)-A(yy+2,xx+1));
        omegarow(xx) = omegarow(xx) - alpharow(xx) + deltarow_value;
        alpharow(xx) = betarow(xx);
        betarow(xx) = gammarow(xx);
        gammarow(xx) = deltarow_value;
        B2(yy,xx) = omegarow(xx);
    end;
end;
```

As an example, if the A block contains the values

| 6 | 7 | 4 | 1 | 1 | 5 | 5 | 7 |
| 4 | 2 | 3 | 3 | 4 | 4 | 3 | 4 |
| 1 | 4 | 1 | 5 | 2 | 7 | 3 | 6 |
| 1 | 2 | 0 | 1 | 4 | 0 | 1 | 3 |
| 5 | 2 | 3 | 5 | 7 | 2 | 3 | 3 |
| 6 | 6 | 2 | 3 | 5 | 7 | 0 | 6 |
| 0 | 5 | 2 | 3 | 5 | 5 | 3 | 7 |
| 5 | 2 | 2 | 1 | 7 | 3 | 2 | 4 |

The matlab code will output the following R2 values

| 0 | 0 | 0  | 0  | 0  | 0  | 0 | 0 |
| 0 | 0 | 0  | 0  | 0  | 0  | 0 | 0 |
| 0 | 0 | 18 | 21 | 22 | 21 | 0 | 0 |
| 0 | 0 | 21 | 29 | 28 | 25 | 0 | 0 |
| 0 | 0 | 18 | 22 | 27 | 28 | 0 | 0 |
| 0 | 0 | 18 | 17 | 23 | 27 | 0 | 0 |
| 0 | 0 | 0  | 0  | 0  | 0  | 0 | 0 |
| 0 | 0 | 0  | 0  | 0  | 0  | 0 | 0.|

And the following B2 values:

| 0 | 0 | 0  | 0  | 0  | 0  | 0 | 0 |
| 0 | 0 | 0  | 0  | 0  | 0  | 0 | 0 |
| 0 | 0 | 20 | 23 | 29 | 23 | 0 | 0 |
| 0 | 0 | 21 | 22 | 31 | 28 | 0 | 0 |
| 0 | 0 | 15 | 15 | 20 | 22 | 0 | 0 |
| 0 | 0 | 13 | 9  | 17 | 20 | 0 | 0 |
| 0 | 0 | 0  | 0  | 0  | 0  | 0 | 0 |
| 0 | 0 | 0  | 0  | 0  | 0  | 0 | 0 |

Note that this example only covers pixels two samples away from the border. Samples closer to the border need to be handled in a different manner, for instance by padding the block or accessing samples outside the block.

As can be seen by the matlab code or the C++ code, three absdiff operations per R-value (i.e., per weight) are calculated, and three absdiff operations per B-value. In total this amounts to six absdiff operations per filtered pixel. However, embodiments of the present invention further reduce the total absdiff operations per filtered pixel that are necessary.

Figure 2:
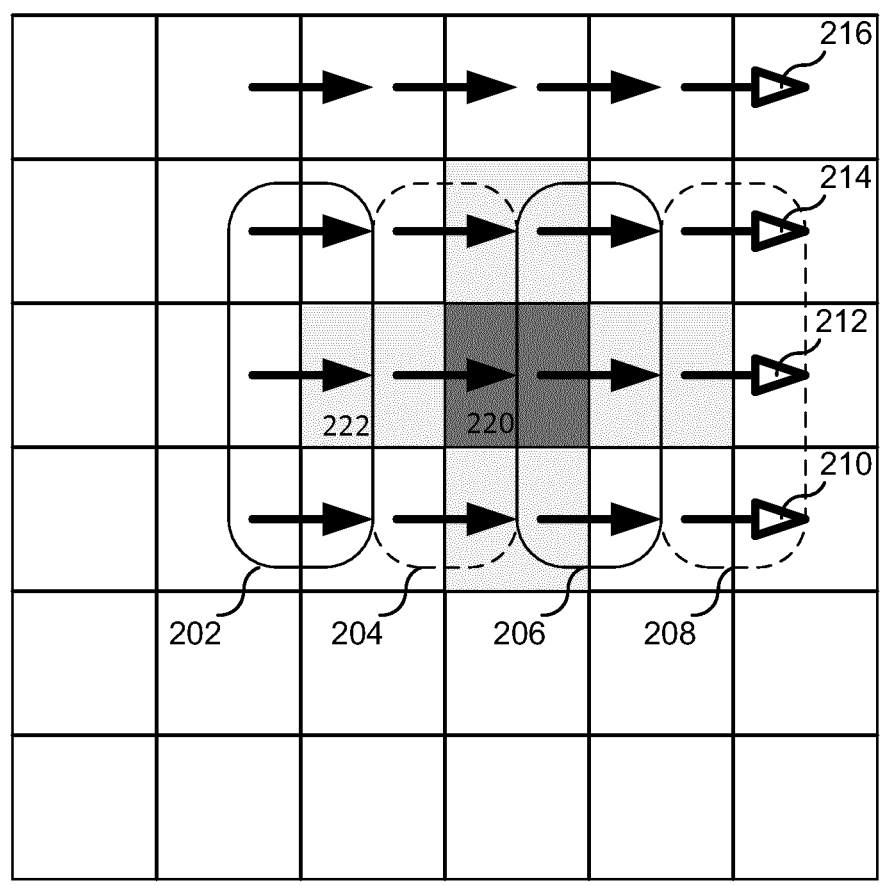
FIG. 2 illustrates a diagram according to one embodiment.

FIG. 2 illustrates an example embodiment. As shown, reference numeral 202 denotes R_alpha, reference numeral 204 denotes R_beta, reference numeral 206 denotes R_gamma, and reference numeral 208 denotes R_delta. Further, reference numeral 210 denotes R_delta_value=abs(A(y+1,x+2)-A(y+1,x+1) (new value), reference numeral 212 denotes R_gamma_row[xx] (stored value), reference numeral 214 denotes R_beta_row[xx] (stored value), and reference numeral 216 denotes R_alpha_row[xx] (stored value).

As can be seen, only one value, R_delta_value, needs to be calculated per weight (the other values are stored values). Using R_delta_value, it is possible to update R_omega_row[xx], for example by the equation R_omega_row[xx]=R_omega_row[xx]-R_alpha_row[xx]+R_delta_value. By setting R_delta=R_omega_row[xx], it is then possible to update omega.

As seen in FIG. 2, we only calculate one new absdiff per pixel, namely in the R_delta_value represented by the bottom right arrow denoted by reference numeral 210. This is used to update the R_omega_row[xx], which prior to the calculation step holds the sum of the top three arrows in the right most column (denoted by reference numerals 212-216), but after the update holds the sum of the bottom three arrows of the right most column (denoted by reference numerals 210-214). This new R_omega_row[xx] value equals the R_delta value, which is used to update the R_omega value (not shown) in a similar fashion to FIG. 1. Before the update of the R_omega value, it contains the sum of R_alpha, R_beta and R_gamma, which is equal to the R value of the previous pixel (i.e., the pixel 222 to the left of the darkest pixel 220). After the update, the R_omega value contains the sum of R_beta, R_gamma and R_delta, which is the R-value of the current pixel (i.e., the darkest pixel 220).

Note that R_alpha_row, R_beta_row, R_gamma_row and R_omega_row are line buffers, i.e., they can store a full line of the block. Meanwhile R_alpha, R_beta, R_gamma, R_delta, omega but also R_delta_value are scalar values.

The full update step/calculation step is thus contained in the matlab code below:

```
R_delta_value = abs(A(yy+1,xx+2) - A(yy+1,xx+1)); % new value
R_omega_row(xx) = R_omega_row(xx) - R_alpha_row(xx) + R_delta_value;
R_alpha_row(xx) = R_beta_row(xx);
R_beta_row(xx) = R_gamma_row(xx);
R_gamma_row(xx) = R_delta_value;
R_delta = R_omega_row(xx);
R_omega = R_omega - R_alpha + R_delta;
R_alpha = R_beta;
R_beta = R_gamma;
R_gamma = R_delta;
R3(yy,xx) = R_omega;
```

Figure 3:
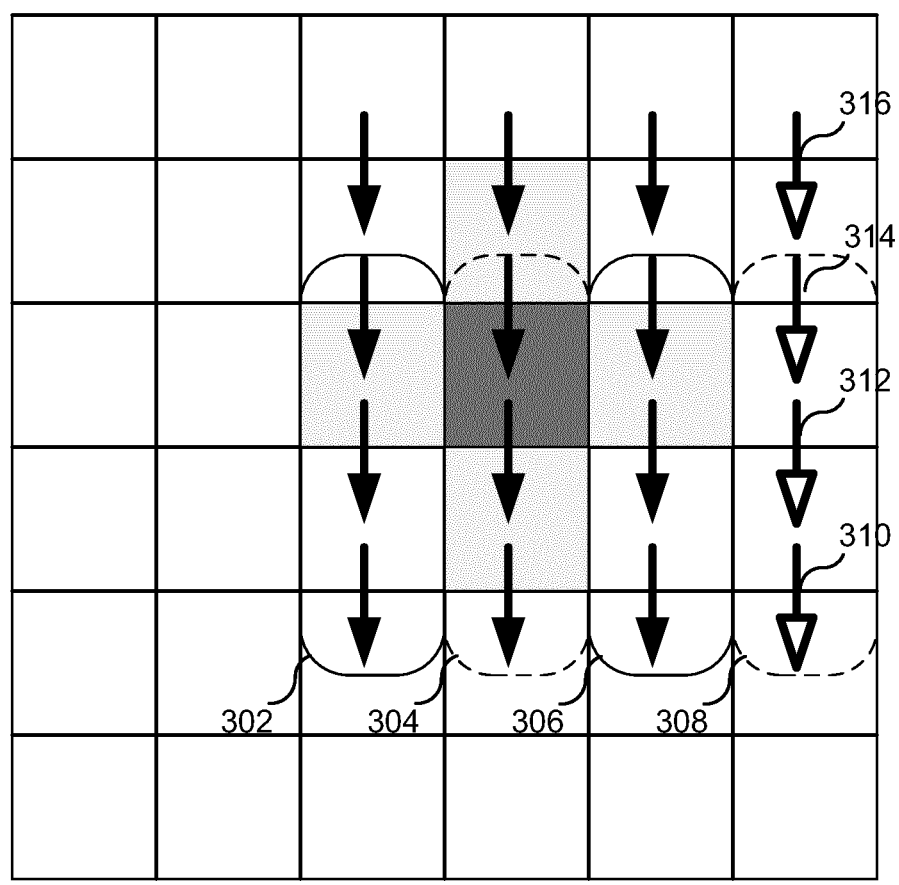
FIG. 3 illustrates a diagram according to one embodiment.

A similar technique can also be used when calculating the difference against the pixel below, as can be seen in FIG. 3. As shown, reference numeral 302 denotes B_alpha, reference numeral 304 denotes B_beta, reference numeral 306 denotes B_gamma, and reference numeral 308 denotes B_delta. Further, reference numeral 310 denotes B_delta_value=abs(A(y+2,x+2)−A(y+1,x+2)) (new value), reference numeral 312 denotes B_gamma_row[xx] (stored value), reference numeral 314 denotes B_gamma_row[xx] (stored value), and reference numeral 316 denotes B_alpha_row[xx] (stored value).

Note how only one absdiff operation, namely when calculating B_delta_value, is needed to calculate the B value (also referred to as the B_omega value) for a sample weight. The value B_delta_value is used to update the B_omega_row[xx] value (for example, by B_omega_row[xx]=B_omega_row[xx]−B_alpha_row[xx]+B_delta_value), which is set to B_delta. With B_delta and B_alpha, the B_omega value can be updated as shown.

The necessary matlab code can be written as:

```
B_delta_value = abs(A(yy+2,xx+1) − A(yy+1,xx+1)); % new value
B_omega_row(xx) = B_omega_row(xx) − B_alpha_row(xx) + B_delta_value;
```

-continued

```
B_alpha_row(xx) = B_beta_row(xx);
B_beta_row(xx) = B_gamma_row(xx);
B_gamma_row(xx) = B_delta_value;
B_delta = B_omega_row(xx);
B_omega = B_omega − B_alpha + B_delta;
B_alpha = B_beta;
B_beta = B_gamma;
B_gamma = B_delta;
B3(yy,xx) = B_omega;
```

Combined, the following matlab code calculates both the R and B values for the interior of the block.

```
B3 = zeros(size(A));
R3 = zeros(size(A));
for xx = 1:size(A,2)−2
    R_alpha_row(xx) = 0;
    R_beta_row(xx) = 0;
    R_gamma_row(xx) = abs(A(1,xx+2) − A(1,xx+1));
    R_omega_row(xx) = R_alpha_row(xx) + R_beta_row(xx) + R_gamma_row(xx);
    B_alpha_row(xx) = 0;
    B_beta_row(xx) = abs(A(1,xx+1)−0);
    B_gamma_row(xx) = abs(A(2,xx+1) − A(1,xx+1));
    B_omega_row(xx) = B_alpha_row(xx) + B_beta_row(xx) + B_gamma_row(xx);
end;
R_alpha = 0;
R_beta = abs(A(1,1) − 0) + abs(A(2,1) − 0);
R_gamma = abs(A(1,1) − A(1,2)) + abs(A(2,1) − A(2,2))
R_omega = R_alpha + R_beta + R_gamma;
B_alpha = 0;
B_beta = 0;
B_gamma = abs(A(1,1) − 0 ) + abs(A(2,1) − A(1,1));
B_omega = B_alpha + B_beta + B_gamma;
for yy = 1:size(A,1)−2
    for xx = 1:size(A,2)−2
        R_delta_value = abs(A(yy+1,xx+2) − A(yy+1,xx+1)); % new value
        R_omega_row(xx) = R_omega_row(xx) − R_alpha_row(xx) + R_delta_value;
        R_alpha_row(xx) = R_beta_row(xx);
        R_beta_row(xx) = R_gamma_row(xx);
        R_gamma_row(xx) = R_delta_value;
        R_delta = R_omega_row(xx);
        R_omega = R_omega − R_alpha + R_delta;
        R3(yy,xx) = R_omega;
        R_alpha = R_beta;
        R_beta = R_gamma;
        R_gamma = R_delta;
        %%
        B_delta_value = abs(A(yy+2,xx+1) − A(yy+1,xx+1)); % new value
        B_omega_row(xx) = B_omega_row(xx) − B_alpha_row(xx) + B_delta_value;
        B_alpha_row(xx) = B_beta_row(xx);
        B_beta_row(xx) = B_gamma_row(xx);
        B_gamma_row(xx) = B_delta_value;
        B_delta = B_omega_row(xx);
        B_omega = B_omega − B_alpha + B_delta;
        B_alpha = B_beta;
        B_beta = B_gamma;
        B_gamma = B_delta;
        B3(yy,xx) = B_omega;
    end;
end;
```

Using the same input A matrix as above, the matlab code will produce the matrices R3 and B3 as shown below:

| B3= | | | | | | | |
|---|---|---|---|---|---|---|---|
| 22 | 29 | 26 | 18 | 20 | 22 | 0 | 0 |
| 25 | 20 | 21 | 19 | 26 | 22 | 0 | 0 |
| 19 | 14 | 20 | 23 | 29 | 23 | 0 | 0 |
| 22 | 15 | 21 | 22 | 31 | 28 | 0 | 0 |
| 26 | 16 | 15 | 15 | 20 | 22 | 0 | 0 |
| 25 | 17 | 13 | 9 | 17 | 20 | 0 | 0 |

-continued

| 0 | 0 | 0 | 0 | 0 | 0 | 0 | 0 |
|---|---|---|---|---|---|---|---|
| 0 | 0 | 0 | 0 | 0 | 0 | 0 | 0 |

R3=

| 17 | 10 | 8  | 8  | 6  | 8  | 0 | 0 |
|----|----|----|----|----|----|---|---|
| 11 | 17 | 18 | 20 | 18 | 20 | 0 | 0 |
| 17 | 17 | 18 | 21 | 22 | 21 | 0 | 0 |
| 18 | 19 | 21 | 29 | 28 | 25 | 0 | 0 |
| 18 | 16 | 18 | 22 | 27 | 28 | 0 | 0 |
| 25 | 20 | 18 | 17 | 23 | 27 | 0 | 0 |
| 0  | 0  | 0  | 0  | 0  | 0  | 0 | 0 |
| 0  | 0  | 0  | 0  | 0  | 0  | 0 | 0 |

Note that while this is not the same for the first two rows and the first two columns as B2/R2, the samples that are two steps away from the border are the same, and they are the ones that we want to calculate. Hence we have identical results with only two absdiff operations per sample, which is a reduction by a factor of three against JVET-K0247 and a reduction by a factor of nine against the implementation of [2].

It should be noted that the code above starts filtering from the top left sample, even though no filtered output is required for that sample. This simplifies the set-up of the necessary line buffers/arrays R_omega_row( ), R_alpha_row( ) R_beta_row( ), R_gamma_row( ) and the necessary scalar variables R_omega, R_alpha, R_beta and R_gamma. However it involves unnecessary calculations. Hence it is possible to avoid these calculations with a slightly more involved code.

Figure 4:
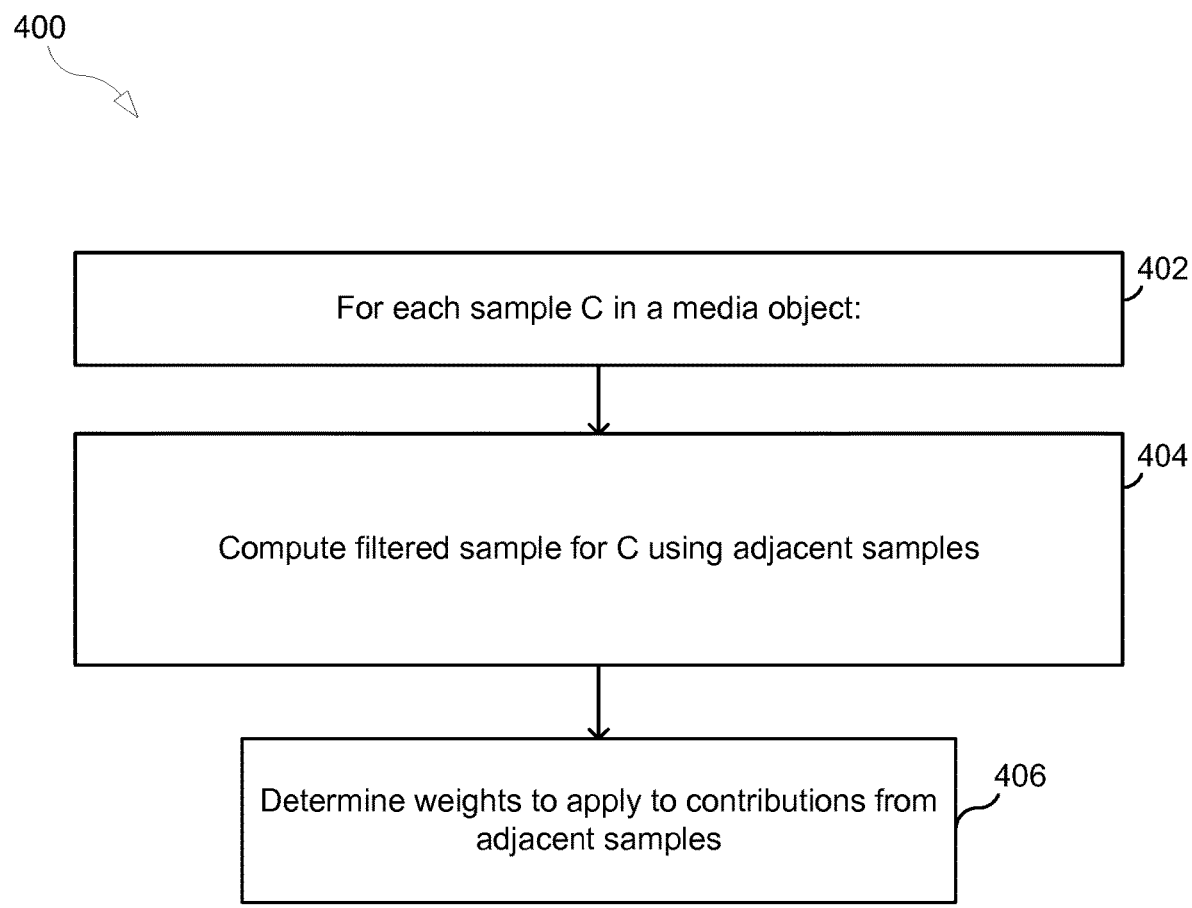
FIG. 4 is a flow chart illustrating a process according to one embodiment.

FIG. 4 illustrates a process 400 of applying filtering (such as bilateral filtering) to a media object comprising a plurality of samples. For each sample C in a media object, of the plurality of samples (step 402), a filtered sample for C is computed using adjacent samples (step 404). Computing a filtered sample for C using adjacent samples includes determining weights to apply to contributions from the adjacent samples (step 406). Determining such weights may include any of the embodiments disclosed herein, such as using one or more of the R_omega and B_omega values for determining such weights.

Figure 5:
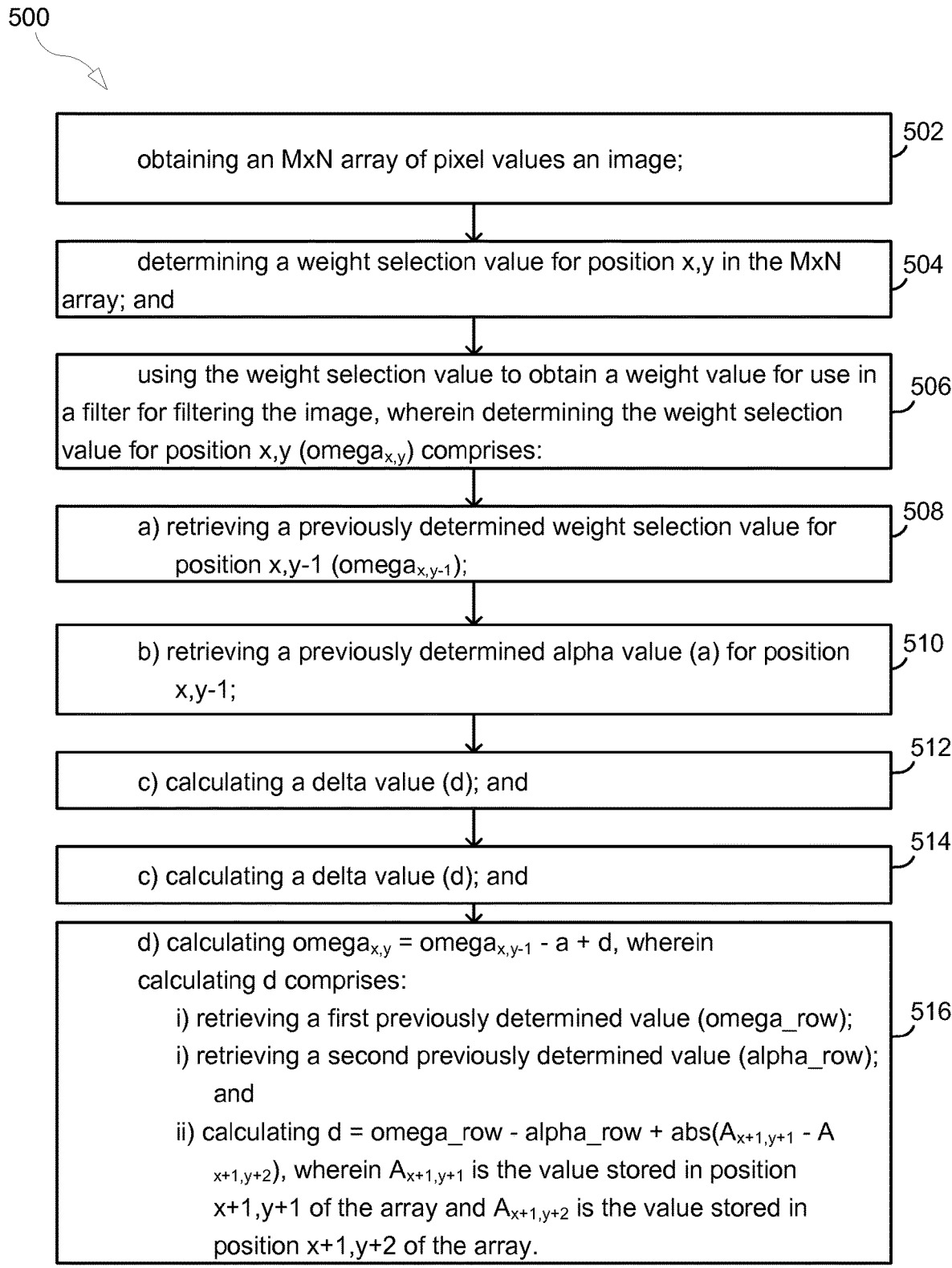
FIG. 5 is a flow chart illustrating a process according to one embodiment.

FIG. 5 illustrates a process 500. Process 500 may be used, for example, when applying bilateral filtering to a media object comprising a plurality of samples. The method includes, obtaining an M×N array of pixel values an image (step 502). The method includes determining a weight selection value for position x,y in the M×N array (step 504). The method includes using the weight selection value to obtain a weight value for use in a filter for filtering the image (step 506). Determining the weight selection value for position x,y (omega$_{x,y}$) includes a) retrieving a previously determined weight selection value for position x,y-1 (omega$_{x,y-1}$) (step 508); b) retrieving a previously determined alpha value (a) for position x,y-1 (step 510); c) calculating a delta value (d) (step 512); and d) calculating omega$_{x,y}$=omega$_{x,y-1}$-a+d (step 512). Calculating d includes: i) retrieving a first previously determined value (omega_row); i) retrieving a second previously determined value (alpha_row); and ii) calculating d=omega_row-alpha_row+abs($A_{x+1,y+1}$-$A_{x+1,y+2}$), wherein $A_{x+1,y+1}$ is the value stored in position x+1,y+1 of the array and $A_{x+1,y+2}$ is the value stored in position x+1,y+2 of the array.

In embodiments, omega_row is equal to [abs($A_{x-2,y+1}$-$A_{x-2,y+2}$)+abs($A_{x-1,y+1}$-$A_{x-2,y+2}$)+abs($A_{x,y+1}$-$A_{x,y+2}$)], and alpha_row is equal to [abs($A_{x-2,y+1}$-$A_{x-2,y+2}$)].

Figure 6:
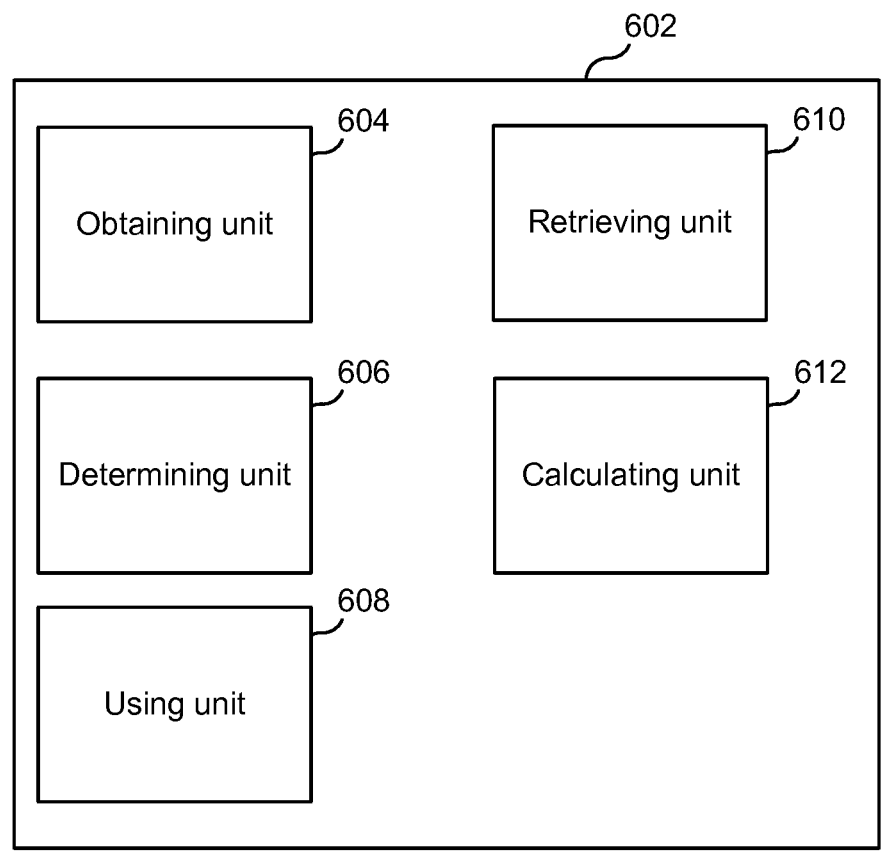
FIG. 6 is a diagram showing functional units of a node according to one embodiment.

FIG. 6 is a diagram showing functional units of node 602 (e.g. an encoder/decoder) for applying filtering (such as bilateral filtering) to a media object comprising a plurality of samples, according to an embodiment. Node 502 includes an obtaining unit 604, a determining unit 606, a using unit 608, a retrieving unit 610, and a calculating unit 612. Obtaining unit 604 is configured to obtain an M×N array of pixel values an image. Determining unit 606 is configured to determine a weight selection value for position x,y in the M×N array. Using unit 608 is configured to use the weight selection value to obtain a weight value for use in a filter for filtering the image. Determining unit 606 is further configured to determine the weight selection value for position x,y (omega$_{x,y}$) by a) retrieving (via retrieving unit 610) a previously determined weight selection value for position x,y-1 (omega$_{x,y-1}$); b) retrieving (via retrieving unit 610) a previously determined alpha value (a) for position x,y-1 (step 510); c) calculating (via calculating unit 612) a delta value (d) (step 512); and d) calculating (via calculating unit 612) omega$_{x,y}$=omega$_{x,y-1}$-a+d (step 512). Calculating d includes: i) retrieving (via retrieving unit 610) a first previously determined value (omega_row); i) retrieving (via retrieving unit 610) a second previously determined value (alpha_row); and ii) calculating (via calculating unit 612) d=omega_row-alpha_row+abs($A_{x+1,y+1}$-$A_{x+1,y+2}$), wherein $A_{x+1,y+1}$ is the value stored in position x+1,y+1 of the array and $A_{x+1,y+2}$ is the value stored in position x+1,y+2 of the array.

Figure 7:
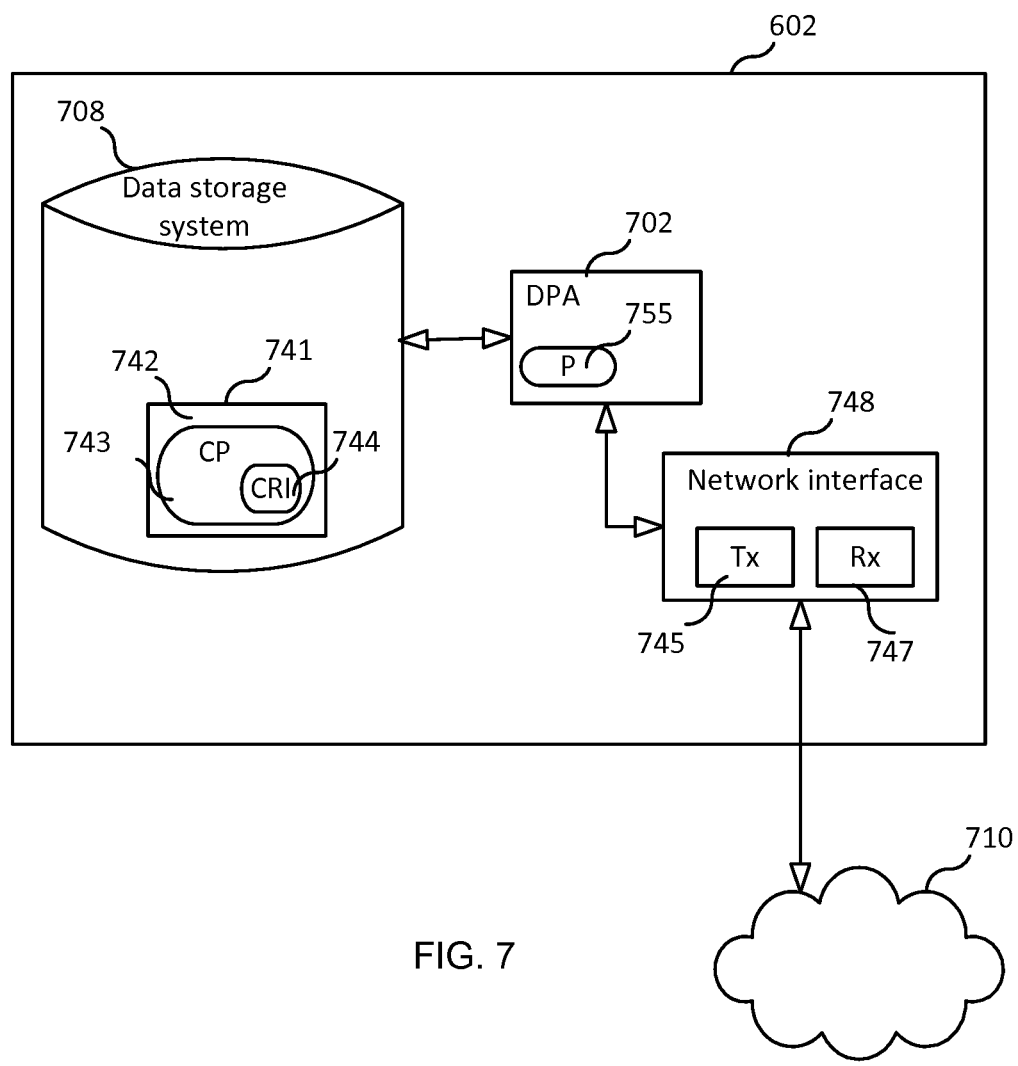
FIG. 7 is a block diagram of a node according to one embodiment.

FIG. 7 is a block diagram of node 602 (e.g., an encoder/decoder) for applying filtering (such as bilateral filtering) to a media object comprising a plurality of samples, according to some embodiments. As shown in FIG. 7, node 602 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like); a network interface 748 comprising a transmitter (Tx) 745 and a receiver (Rx) 747 for enabling node 602 to transmit data to and receive data from other nodes connected to a network 710 (e.g., an Internet Protocol (IP) network) to which network interface 748 is connected; and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 643 is configured such that when executed by PC 702, the CRI causes node 602 to perform steps described herein (e.g., steps described herein with reference to the flow charts). In other embodiments, node 602 may be configured to perform steps described herein without the need for code. That is, for example, PC 702 may consist merely of one or more ASICs. Hence, the features of the embodiments described herein may be implemented in hardware and/or software.

While various embodiments of the present disclosure have been described herein, it should be understood that they have been presented by way of example only, and not limitation. Thus, the breadth and scope of the present disclosure should not be limited by any of the above-described exemplary embodiments.

Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method comprising:
   obtaining an M×N array of pixel values an image;
   determining, based on lookup tables, a weight selection value for position x,y in the M×N array; and
   using the weight selection value to obtain a weight value for use in a filter for bilateral filtering the image, wherein determining the weight selection value for position x,y,$\text{omega}_{x,y}$, comprises:
   a) retrieving a previously determined weight selection value for position x,y−1, $\text{omega}_{x,y-1}$;
   b) retrieving a previously determined alpha value, a, for position x,y−1;
   c) calculating a delta value, d; and
   d) calculating $\text{omega}_{x,y}=\text{omega}_{x,y-1}-a+d$, wherein calculating d comprises:
   i) retrieving a first previously determined value, omega_row, wherein omega_row is equal to $[abs(A_{x-2,y+1}-A_{x-2,y+2})+abs(A_{x-1,y+1}-A_{x-2,y+2})+abs(A_{x,y+1}-A_{x,y+2})]$;
   i) retrieving a second previously determined value, alpha_row, wherein alpha_row is equal to $abs(A_{x-2,y+1}-A_{x-2,y+2})$; and
   ii) calculating $d=\text{omega\_row}-\text{alpha\_row}+abs(A_{x+1,y+1}-A_{x+1,y+2})$,
   wherein $A_{x+1,y+1}$ is the value stored in position x+1,y+1 of the array, $A_{x+1,y+2}$ is the value stored in position x+1, y+2 of the array, $A_{x-2,y+1}$ is the value stored in position x−2,y+1 of the array, $A_{x-2,y+2}$ is the value stored in position x−2,y+2 of the array, $A_{x-1,y+1}$ is the value stored in position x−1,y+1 of the array, $A_{x,y+1}$ is the value stored in position x,y+1 of the array and $A_{x,y+2}$ is the value stored in position x,y+2 of the array.

2. A computer program product comprising a non-transitory computer readable medium storing a computer program comprising instructions which when executed by processing circuitry of a device causes the device to perform the method of claim 1.

3. An encoder (602) comprising:
   an obtaining unit (604) configured to obtain an M×N array of pixel values an image;
   a determining unit (606) configured to determine, based on lookup tables, a weight selection value for position x,y in the M×N array; and
   a using unit (608) configured to use the weight selection value to obtain a weight value for use in a filter for bilateral filtering the image, wherein determining the weight selection value for position x,y, $\text{omega}_{x,y}$, comprises:
   a) retrieving by a retrieving unit (610) a previously determined weight selection value for position x,y−1, $\text{omega}_{x,y-1}$;
   b) retrieving by the retrieving unit (610) a previously determined alpha value, a, for position x,y−1;
   c) calculating by a calculating unit (612) a delta value, d; and
   d) calculating by the calculating unit (612) $\text{omega}_{x,y}=\text{omega}_{x,y-1}-a+d$, wherein calculating d comprises:
   i) retrieving by the retrieving unit (610) a first previously determined value, omega_row, wherein omega_row is equal to $[abs(A_{x-2,y+1}-A_{x-2,y+2})+abs(A_{x-1,y+1}-A_{x-2,y+2})+abs(A_{x,y+1}-A_{x,y+2})]$;
   i) retrieving by the retrieving unit (610) a second previously determined value, alpha_row, wherein alpha_row is equal to $abs(A_{x-2,y+1}-A_{x-2,y+2})$; and
   ii) calculating by the calculating unit (612) $d=\text{omega\_row}-\text{alpha\_row}+abs(A_{x+1,y+1}-A_{x+1,y+2})$,
   wherein $A_{x+1,y+1}$ is the value stored in position x+1,y+1 of the array, $A_{x+1,y+2}$ is the value stored in position x+1, y+2 of the array, $A_{x-2,y+1}$ is the value stored in position x−2,y+1 of the array, $A_{x-2,y+2}$ is the value stored in position x−2,y+2 of the array, $A_{x-1,y+1}$ is the value stored in position x−1,y+1 of the array, $A_{x,y+1}$ is the value stored in position x,y+1 of the array and $A_{x,y+2}$ is the value stored in position x,y+2 of the array.

4. A decoder (602) comprising:
   an obtaining unit (604) configured to obtain an M×N array of pixel values an image;
   a determining unit (606) configured to determine, based on lookup tables, a weight selection value for position x,y in the M×N array; and
   a using unit (608) configured to use the weight selection value to obtain a weight value for use in a filter for bilateral filtering the image, wherein determining the weight selection value for position x,y, $\text{omega}_{x,y}$, comprises:
   a) retrieving by a retrieving unit (610) a previously determined weight selection value for position x,y−1, $\text{omega}_{x,y-1}$;
   b) retrieving by the retrieving unit (610) a previously determined alpha value, a, for position x,y−1;
   c) calculating by a calculating unit (612) a delta value, d; and
   d) calculating by the calculating unit (612) $\text{omega}_{x,y}=\text{omega}_{x,y-1}-a+d$, wherein calculating d comprises:
   i) retrieving by the retrieving unit (610) a first previously determined value, omega_row, wherein omega_row is equal to $[abs(A_{x-2,y+1}-A_{x-2,y+2})+abs(A_{x-1,y+1}-A_{x-2,y+2})+abs(A_{x,y+1}-A_{x,y+2})]$;
   i) retrieving by the retrieving unit (610) a second previously determined value alpha_row, alpha_row is equal to $abs(A_{x-2,y+1}-A_{x-2,y+2})$; and
   ii) calculating by the calculating unit (612) $d=\text{omega\_row}-\text{alpha\_row}+abs(A_{x+1,y+1}-A_{x+1,y+2})$,
   wherein $A_{x+1,y+1}$ is the value stored in position x+1,y+1 of the array, $A_{x+1,y+2}$ is the value stored in position x+1, y+2 of the array, $A_{x-2,y+1}$ is the value stored in position x−2,y+1 of the array, $A_{x-2,y+2}$ is the value stored in position x−2,y+2 of the array, $A_{x-1,y+1}$ is the value stored in position x−1,y+1 of the array, $A_{x,y+1}$ is the value stored in position x,y+1 of the array and $A_{x,y+2}$ is the value stored in position x,y+2 of the array.

* * * * *